(12) United States Patent
Otsubo et al.

(10) Patent No.: US 12,252,259 B2
(45) Date of Patent: Mar. 18, 2025

(54) SAFETY DEVICE, AND FLYING BODY PROVIDED WITH SAFETY DEVICE

(71) Applicant: NIPPON KAYAKU KABUSHIKI KAISHA, Tokyo (JP)

(72) Inventors: Hideki Otsubo, Tokyo (JP); Yasuhiko Yagihashi, Tokyo (JP); Takuto Yoshioka, Tokyo (JP); Dairi Kubo, Tokyo (JP)

(*) Notice: Subject to any disclaimer, the term of this patent is extended or adjusted under 35 U.S.C. 154(b) by 72 days.

(21) Appl. No.: 17/905,653

(22) PCT Filed: Feb. 22, 2021

(86) PCT No.: PCT/JP2021/006691
§ 371 (c)(1),
(2) Date: Sep. 6, 2022

(87) PCT Pub. No.: WO2021/177083
PCT Pub. Date: Sep. 10, 2021

(65) Prior Publication Data
US 2023/0099036 A1 Mar. 30, 2023

(30) Foreign Application Priority Data

Mar. 6, 2020 (JP) ................................. 2020-039402
Oct. 6, 2020 (JP) ................................. 2020-169453

(51) Int. Cl.
*B64D 17/62* (2006.01)
*B64D 17/42* (2006.01)
*B64D 17/52* (2006.01)

(52) U.S. Cl.
CPC ............. *B64D 17/62* (2013.01); *B64D 17/42* (2013.01); *B64D 17/52* (2013.01)

(58) Field of Classification Search
CPC ........ B64D 17/62; B64D 17/42; B64D 17/52; B64D 17/80; B64D 17/72; B64U 70/83
See application file for complete search history.

(56) References Cited

U.S. PATENT DOCUMENTS

| 1,296,736 A | 3/1919 | Douglas |
| 4,744,301 A * | 5/1988 | Cardoen ................. F42B 12/62 102/386 |

FOREIGN PATENT DOCUMENTS

| CN | 104326086 B | 7/2016 |
| CN | 107054666 A | 8/2017 |

(Continued)

OTHER PUBLICATIONS

ISR; Japan Patent Office; May 18, 2021.
Supplementary European Search Report; Munich; Jan. 22, 2024.

*Primary Examiner* — Justin M Benedik
(74) *Attorney, Agent, or Firm* — Patshegen IP; Moshe Pinchas (57) ABSTRACT

There are provided a safety apparatus and an aerial vehicle including the safety apparatus, in which a lid and an opening end of a container are fixed before operation more firmly than a conventional art to be less susceptible to an external environment. A safety apparatus includes a piston member, a cylinder that accommodates the piston member and is provided with a bore through which the piston member protrudes to the outside during operation, a push-up member that is pushed up in one direction by the piston member, an ejected object 16 that is pushed up while being supported by the push-up member, a gas generator that moves the piston member in the cylinder, and a lid 21 including a projection 21*a*. The projection 21*a* includes a second through hole 21*c*, and an engagement mechanism is configured when a pin member 22 is inserted into the second through hole 21*c* and a first through hole 18*a* provided in a container 18 to engage an opening end of the container 18 and the projection 21*a*.

10 Claims, 7 Drawing Sheets

(56) References Cited

FOREIGN PATENT DOCUMENTS

| | | | |
|---|---|---|---|
| CN | 107054666 | * | 8/2018 |
| EP | 3050805 | B1 | 8/2016 |
| JP | 2020-1680 | A | 1/2020 |
| WO | 2019181989 | A1 | 9/2019 |

* cited by examiner

SAFETY DEVICE, AND FLYING BODY PROVIDED WITH SAFETY DEVICE

TECHNICAL FIELD

The present invention relates to a safety apparatus that ejects an ejected object such as a parachute or a paraglider, and relates to an aerial vehicle including the safety apparatus.

BACKGROUND ART

In recent years, with the development of an autonomous control technology and a flight control technology, an industrial use of an aerial vehicle provided with a plurality of rotor blades called a drone, for example, has been accelerating. The drone flies, for example, by simultaneously rotating a plurality of rotor blades in a well-balanced manner, ascends and descends by increasing or decreasing a rotation speed of the rotor blades, and can advance and retreat by tilting an airframe by increasing and decreasing the rotation speed of the rotor blades. Such aerial vehicles are expected to spread worldwide in the future.

Meanwhile, the risk of fall accidents of the aerial vehicles as described above is considered to be dangerous and hinders spread of the aerial vehicles. In order to reduce the risk of such fall accidents, parachute apparatuses for aerial vehicles have been commercialized as safety apparatuses.

As a parachute deployment device of the parachute apparatus for an aerial vehicle, for example, Patent Literature 1 discloses a parachute deployment device in which a push-up part that pushes up and ejects a parachute is provided below the parachute provided in a container.

CITATION LIST

Patent Literature

Patent Literature 1: EP 3050805 B

SUMMARY OF INVENTION

Technical Problems

When a lid is provided at an opening end of the container of the parachute as in Patent Literature 1, the lid is usually considered to be fixed to the opening end of the container by press-fitting. However, even in a case where such press-fitting and fixing are performed, in some cases, the press-fitting and fixing are released due to an external environment such as aged deterioration of the lid and the container before operation, external force, and vibration, and the lid is detached from the opening end of the container.

It is an object of the present invention to provide a safety apparatus, in which an ejection speed of an ejected object during operation is not lower than in a conventional fixing method, and a lid and an opening end of a container are fixed before operation more firmly than in a conventional art to be less susceptible to an external environment.

Solutions to Problems (1) A safety apparatus of the present invention includes a container having a bottomed cylindrical shape and including an opening end, a lid including, at an edge, a projection in contact with a side wall of the container, and configured to close the opening end before operation and open the opening end of the container after operation, an ejector that is installed inside the container and ejects an ejected object accommodated in the container, and an engagement mechanism that performs engagement between a side wall of the opening end and the projection by inserting a pin member into a first through hole penetrating toward a center of the container in the side wall of the opening end and a second through hole penetrating toward a center of the lid in the projection, or a locking mechanism that performs locking between the side wall of the opening end and the projection by a snap-fit method in which fitting is performed using elasticity of a material constituting the container or the projection.

(2) In the safety apparatus according to (1), preferably, the ejector includes a push-up member that pushes up the lid during operation, in the engagement mechanism, when the lid is pushed up by the push-up member during operation, at least the first through hole or the second through hole is broken by the pin member, or the pin member is broken by the first through hole or the second through hole, and the engagement is released, and in the locking mechanism, when the lid is pushed up by the push-up member during operation, the locking is released.

(3) In the safety apparatus according to (1) or (2), the pin member is preferably provided with a locking portion that prevents the pin member from coming off after the pin member is inserted into the first through hole and the second through hole before operation.

(4) In the safety apparatus according to (1) to (3), a part of the first through hole or a part of the second through hole preferably has a notch.

(5) In the safety apparatus according to (1) to (4), the projection is preferably provided outside the opening end, and the lid preferably includes a receiving member at a position facing the projection and sandwiching the opening end, the receiving member receiving a first end of the pin member.

(6) In the safety apparatus according to (1) to (5), the pin member is preferably provided with, at a second end, a head having a diameter larger than a diameter of the first through hole, and the projection preferably has, on an outer side, a peripheral wall that surrounds an outer periphery of the head and has an inner side communicating with the first through hole.

(7) In the safety apparatus according to (6), the projection preferably has, on the outer side, a cylindrical protrusion having the peripheral wall, and the head is preferably caulked and fixed to the cylindrical protrusion.

(8) In the safety apparatus according to (6) or (7), the head is preferably fixed to the peripheral wall with a resin.

(9) As another aspect, in the safety apparatus according to (1) or (2), in the locking mechanism, a protrusion provided on the projection and a recess provided on the side wall of the opening end are preferably locked with each other, or a recess provided on the projection and a protrusion provided on the side wall of the opening end are preferably locked with each other.

(10) In the safety apparatus according to (1) to (9), the lid preferably has a top surface having an inner side or an outer side provided with a reinforcing member that reinforces the lid.

(11) An aerial vehicle of the present invention includes the safety apparatus according to any of (1) to (10), in which the ejected object is a parachute or a paraglider.

Advantageous Effects of Invention

The present invention can provide a safety apparatus, in which an ejection speed of an ejected object during operation is not lower than in a conventional fixing method, and a lid and an opening end of a container are fixed before operation more firmly than in a conventional art to be less susceptible to an external environment.

BRIEF DESCRIPTION OF DRAWINGS

FIG. 3(a) is a plan view, FIG. 3(b) is a side view.

DESCRIPTION OF EMBODIMENT

Hereinafter, a safety apparatus according to an embodiment of the present invention will be described with reference to FIGS. 1 to 4.

Figure 1:
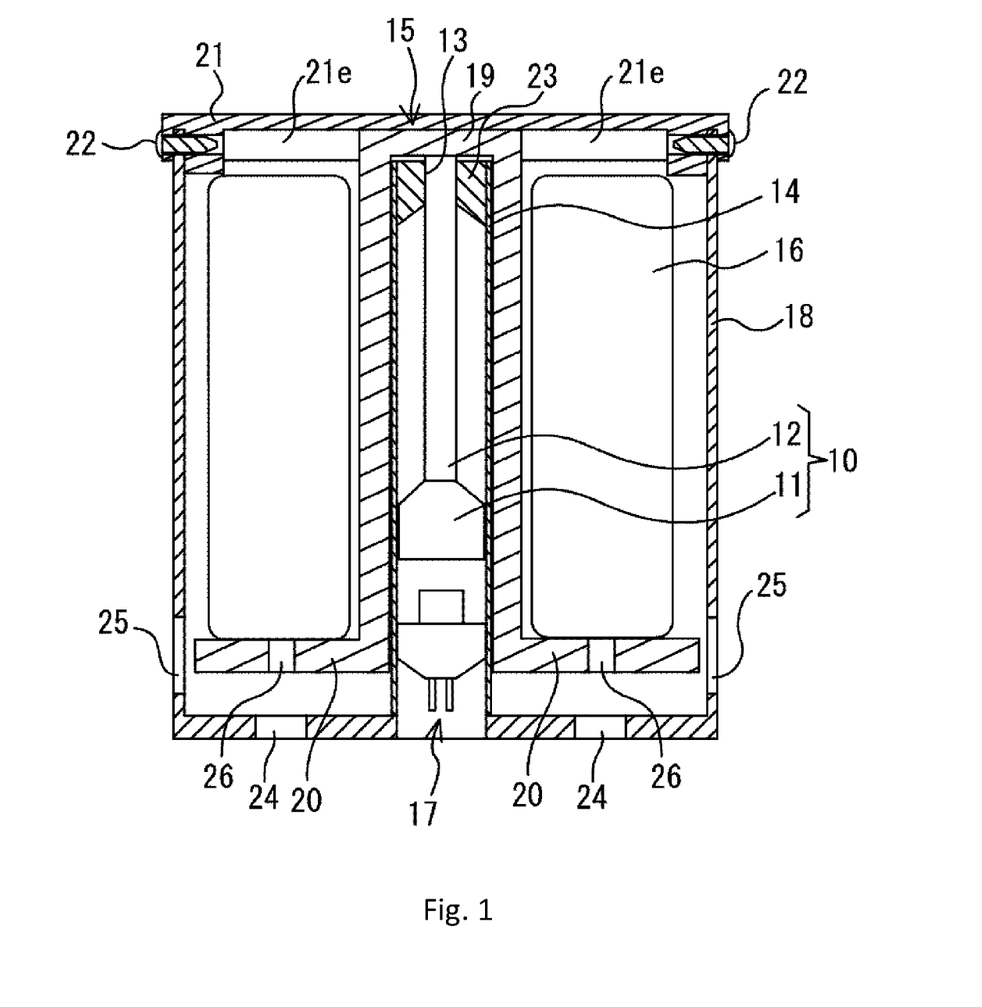
FIG. 1 is a sectional view of a safety apparatus according to an embodiment of the present invention.

As illustrated in FIG. 1, a safety apparatus 100 according to the present embodiment includes at least a piston member 10 as a sliding member, a cylinder 14 that accommodates the piston member 10 and is provided with a bore 13 through which the piston member 10 protrudes to the outside (upward in FIG. 1) during operation, a push-up member 15 that is pushed up in one direction (upward in FIG. 1) by the piston member 10, an ejected object 16 that is pushed up while being supported by the push-up member 15, a gas generator (micro gas generator or the like) 17 as a power source that moves the piston member 10 in the cylinder 14, a bottomed cylindrical container 18 that accommodates the piston member 10, the cylinder 14, the push-up member 15, the ejected object 16, and the gas generator 17, and a lid 21 that closes an opening end of the container 18.

In the present embodiment, the ejected object 16 is a parachute or a paraglider. The gas generator 17 is disposed below a body 11 (described later) of the piston member 10 in a state of being press-fitted into an opening end below the cylinder 14. A lower part of the cylinder 14 is fixed to a bottom of the container 18.

The piston member 10 includes the body 11 having a part with an outer diameter substantially equal to an inner diameter of the cylinder 14, and includes a rod 12 connected to the body 11, extending upward, and having a smaller diameter than the body 11. An upper end of the rod 12 is fixed to an inner surface of an upper end of a bottomed cylindrical portion 19 (described later) of the push-up member 15 through the bore 13 of the cylinder 14. A stopper 23 disposed so as to surround a part of the rod 12 of the piston member 10 is provided in an upper inner part of the cylinder 14. That is, the rod 12 is disposed in a state of being inserted through the stopper 23. As a result, when the piston member 10 moves upward, the body 11 comes into contact with the stopper 23 and stops, and thus the body 11 is not released to the outside from the inside of the cylinder 14.

As illustrated in FIG. 1, the push-up member 15 includes a bottomed cylindrical portion 19 disposed so as to cover a part of the cylinder 14, that is, an outer part of the cylinder 14 except for a vicinity of the opening end at which the gas generator 17 is disposed, and the push-up member 15 includes a support 20 having a disc shape, provided as a flange at an opening edge of the bottomed cylindrical portion 19, and supporting the ejected object 16. In such a configuration, a bottom of the support 20 is provided apart from an inner surface of the bottom of the container 18 in an initial state. The support 20 has a vent hole 26 for reducing an influence of a negative pressure generated between the bottom of the ejected object 16 and the support 20 during operation to facilitate ejection of the ejected object 16. An outer periphery of the support 20 is formed so as not to be in contact with an inner side of the container 18.

Figure 2A:
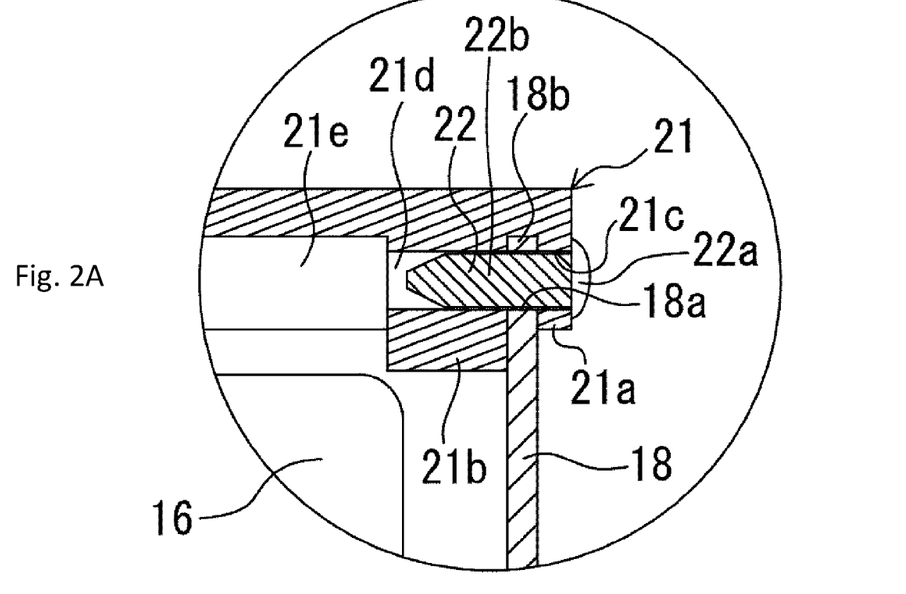
FIG. 2(a) is a partially enlarged view of the safety apparatus in FIG. 1.
Figure 3A:
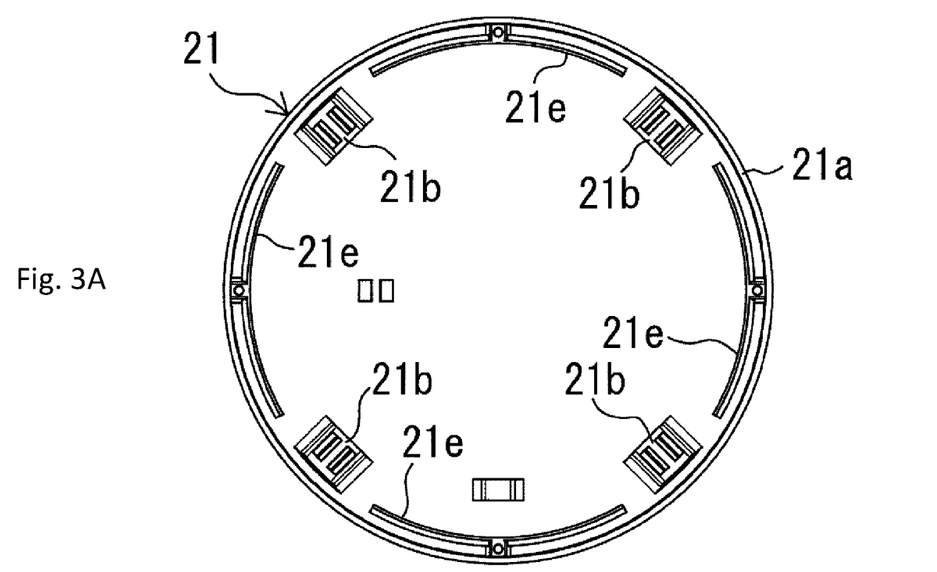
Figure 3B:
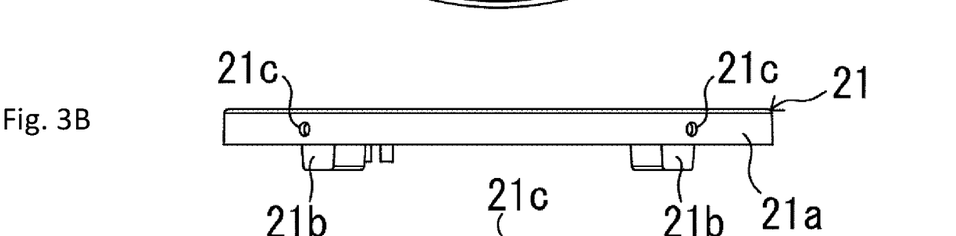
Figure 3C:
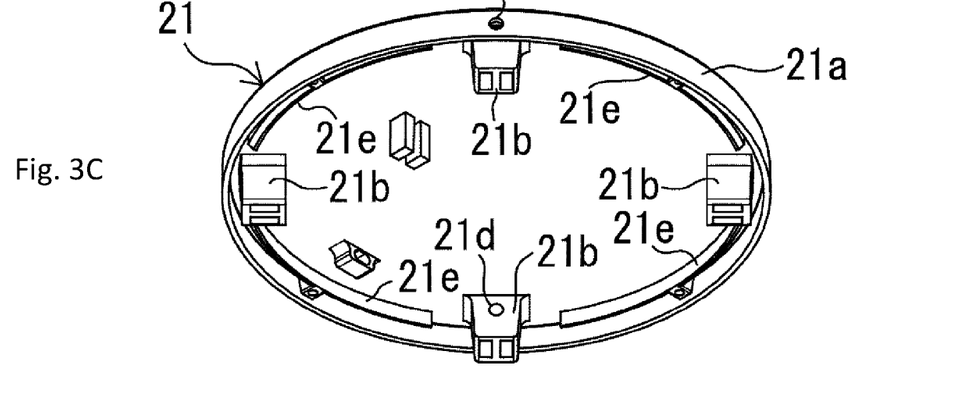
FIG. 3(c) is a perspective view of a lid in the safety apparatus in FIG. 1.

As illustrated in FIGS. 2(a) and 3, the lid 21 includes a cylindrical projection 21a extending from an edge toward the container 18, a receiving member 21b provided so as to protrude toward the container 18 at a position facing the projection 21a and sandwiching the opening end of the container 18, and a reinforcing member 21e reinforcing a top surface of the lid 21.

The projection 21a has a second through hole 21c penetrating toward a center of the lid 21. A pin member 22 is inserted into the second through hole 21c and a first through hole 18a (described later) to configure an engagement mechanism that engages the opening end of the container 18 and the projection 21a. Here, the projection 21a has a cylindrical shape, but may be any projection (such as a protrusion) provided so as to face the receiving member 21b and having the second through hole 21c, and need not have a cylindrical shape.

The receiving member 21b has a second through hole 21d penetrating toward the center of the lid 21. When the pin member 22 is inserted into the second through hole 21c and the first through hole 18a, the second through hole 21d receives a distal end of the pin member 22 (the distal end of the pin member 22 is inserted), and the opening end of the container 18 and the lid 21 can be more firmly fixed.

The pin member 22 includes a head 22a having a diameter larger than a diameter of the second through hole 21c, and a rod 22b provided with the head 22a at one end and inserted into and fitted to the first through hole 18a, the second through hole 21c, and the second through hole 21d. The pin member 22 is provided with a locking portion that prevents the pin member from coming off after being inserted into the first through hole 18a, the second through hole 21c, and the second through hole 21d before operation. Specific examples of the pin member 22 include a brush clip pin, a trim clip pin, and the like, but are not limited thereto, and any pin member may be used as long as having a locking portion (including a locking portion having a relatively high frictional force on a surface of the rod 22b) that prevents the pin member from coming off after being inserted into the first through hole 18a, the second through hole 21c, and the second through hole 21d.

The reinforcing member 21e is provided inside the top surface of the lid 21 at a position not in contact with the upper end of the bottomed cylindrical portion 19 of the push-up member 15. Here, as a modification, the reinforcing member 21e may have any shape as long as being reinforceable without being in contact with the upper end of bottomed cylindrical portion 19 of the push-up member 15, and a plurality of reinforcing members may be provided radially outward from the center of the lid, may be in a spiral shape, or may be provided outside the top surface of the lid 21.

Figure 2B:
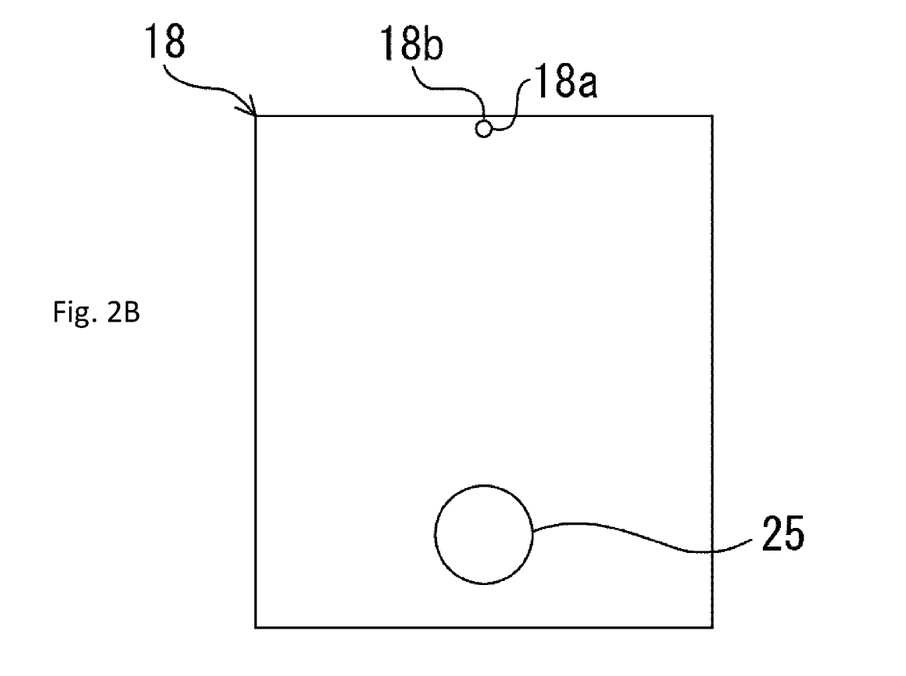
FIG. 2(b) is a side view of a container in the safety apparatus in FIG. 1.

The container 18 has the first through hole 18a and a breakable portion 18b near the opening end. The breakable portion 18b is a portion of the first through hole 18a that breaks when a predetermined force or more is applied toward a top of the drawing of FIG. 2.

As illustrated in FIGS. 1 and 2(b), the bottom of the container 18 is provided with a plurality of vent holes 24 communicating an inside and an outside of the container 18. A side wall of the container 18 is provided with a plurality of vent holes 25 communicating the inside and the outside of the container 18. When the push-up member 15 rapidly moves in the container 18, a negative pressure is generated in a region between the push-up member 15 and a bottom surface of the container 18. The negative pressure makes it difficult to move the push-up member 15. Therefore, by providing the vent holes 24 and 25, the phenomenon of negative pressure can be reduced, and the push-up member 15 can be smoothly moved.

The ejected object 16 is accommodated in the container 18 between an inner surface of the container 18 and an outer surface of the bottomed cylindrical portion 19 of the push-up member 15, for example, so as to surround the outer surface of the bottomed cylindrical portion 19. Note that the ejected object 16 is connected to, for example, one end of a string (not shown), and the other end of the string is connected to the inside of the container 18 or an airframe 31 of an aerial vehicle 30 (described later).

As the gas generator 17, only an igniter may be used, or a gas generator including an igniter and a gas generating agent may be used. Alternatively, a hybrid or a stored gas generator that cleaves a sealing plate in a small gas cylinder by a gunpowder igniter and discharges internal gas to the outside may be used. In this case, as a pressurized gas in the gas cylinder, a non-flammable gas such as argon, helium, nitrogen, or carbon dioxide, or a mixture thereof can be used. In order to reliably propel a piston when the pressurized gas is released, the gas generator may be provided with a heating element including a gas generating agent composition, a thermite composition, or the like.

The piston member 10, the cylinder 14, the push-up member 15, the gas generator 17, and the like mainly constitute an ejector that ejects the ejected object 16.

In the above configuration, when the gas generator 17 is operated, for example, at time of a fall of the aerial vehicle or the like equipped with the safety apparatus 100, the piston member 10 is propelled upward in the cylinder 14 by pressure of gas generated by the operation. Thus, the push-up member 15 having the bottomed cylindrical portion 19 connected to the rod 12 of the piston member 10 is propelled upward in the container 18. As a result, the lid 21 is pushed up by an upper part of the push-up member 15, and the pin member 22 breaks the breakable portion 18b of the container 18. Then, the lid 21 is easily and quickly detached, the opening end of the container 18 is opened, and the ejected object 16 is ejected to the outside (toward a top of the drawing of FIG. 1) from the inside of the container 18. In a case where the ejected object 16 is a parachute or a paraglider, the ejected object 16 is ejected from the container 18 and then deployed.

Figure 4:
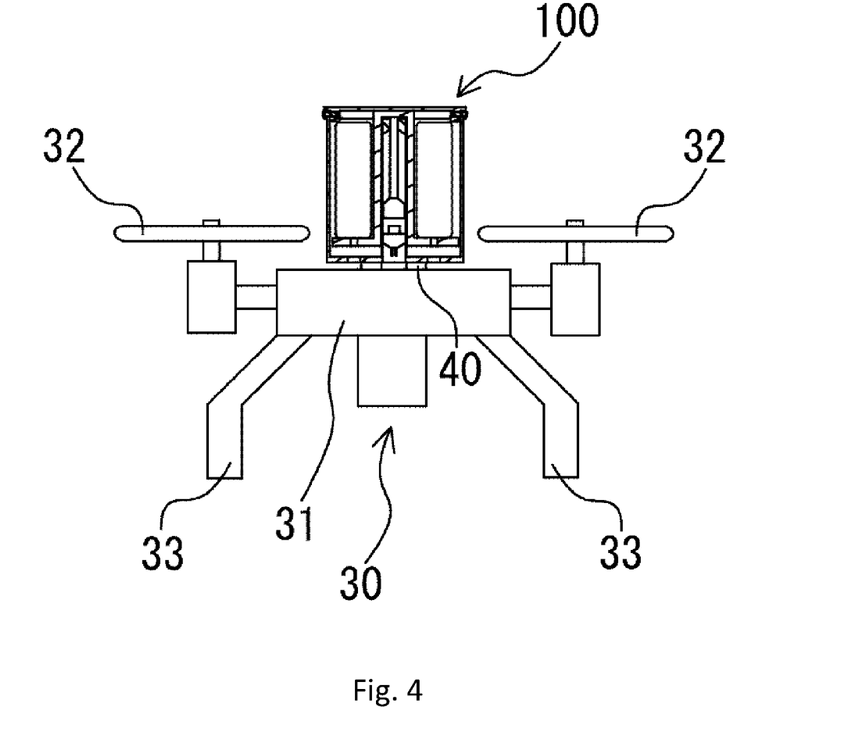
FIG. 4 is a diagram of an aerial vehicle to which the safety apparatus in FIG. 1 is applied.

As illustrated in FIG. 4, the safety apparatus 100 is coupled and fixed to the airframe 31 of the aerial vehicle 30 via a coupling member 40. At this time, as illustrated in FIG. 1, the coupling member 40 couples the container 18 and the airframe 31 at a position not to close the vent holes 24. Therefore, the aerial vehicle 30 includes the airframe 31, the safety apparatus 100 joined to the airframe 31, one or more propulsion mechanisms (for example, propellers) 32 joined to the airframe 31 to propel the airframe 31, and a plurality of legs 33 provided in a lower part of the airframe 31. Here, in practice, a socket for energization is fitted to an electrode in a lower part of the gas generator 17, but for convenience of description, the socket is omitted in FIG. 1.

As described above, in the present embodiment, it is possible to obtain the safety apparatus 100 and the aerial vehicle 30 including the safety apparatus 100, in which an ejection speed of the ejected object during operation is not lower than in a conventional fixing method, and the lid 21 and the opening end of the container 18 are fixed before operation more firmly than in a conventional art to be less susceptible to an external environment.

The embodiment of the present invention has been described above with reference to the drawings. However, the specific configuration of the present invention should not be interpreted as to be limited to the embodiment. The scope of the present invention is defined not by the above embodiment but by claims set forth below, and shall encompass the equivalents in the meaning of the claims and every modification within the scope of the claims.

For example, the present invention includes the following modifications. In the following modifications, parts denoted by the reference signs having the same last two digits as those in the embodiment are similar to those described in the embodiment, unless otherwise described, and a description thereof will be omitted. Further, components that are not particularly described are similar to those in the embodiment, and thus description and illustration thereof may be omitted. In each of the following modifications, differences from the embodiment will be mainly described in principle. The same applies to the following modifications.

Figure 5A:
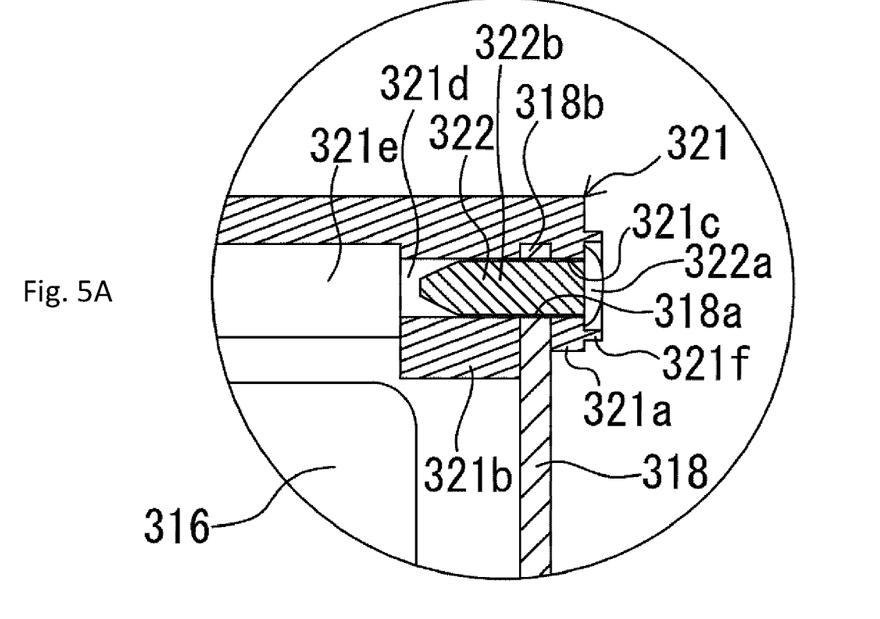
FIG. 5 is a partially enlarged view of a container according to a modification of the safety apparatus in FIG. 1.
Figure 5B:
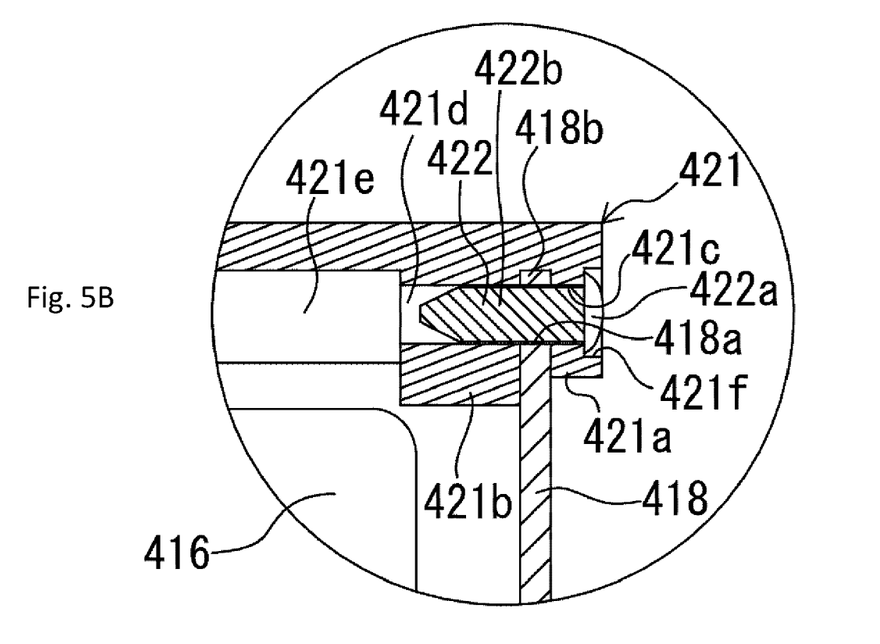

The container 18 according to the embodiment has the first through hole 18a and the breakable portion 18b as illustrated in FIG. 2(b), but alternatively, as illustrated in FIG. 5, a container 118 provided with a second through hole 118a having a notch at an opening end and a breakable portion 118b formed at a position sandwiching the notch may be used. The breakable portion may be provided at the through hole formed in the projection of the lid, close to the bottom surface of the container. In a case where the breakable portion is provided at a distal end of the through hole of the projection of the lid, a notch similar to the notch and a breakable portion (similar to the breakable portion 118b) may be formed at the distal end of the through hole.

In the embodiment and the above modification, the first through hole or the second through hole is broken by the pin member to release engagement of the engagement mechanism, but the present invention is not limited to this configuration. That is, the pin member may be broken by the first through hole or the second through hole to release the engagement.

Figure 6:
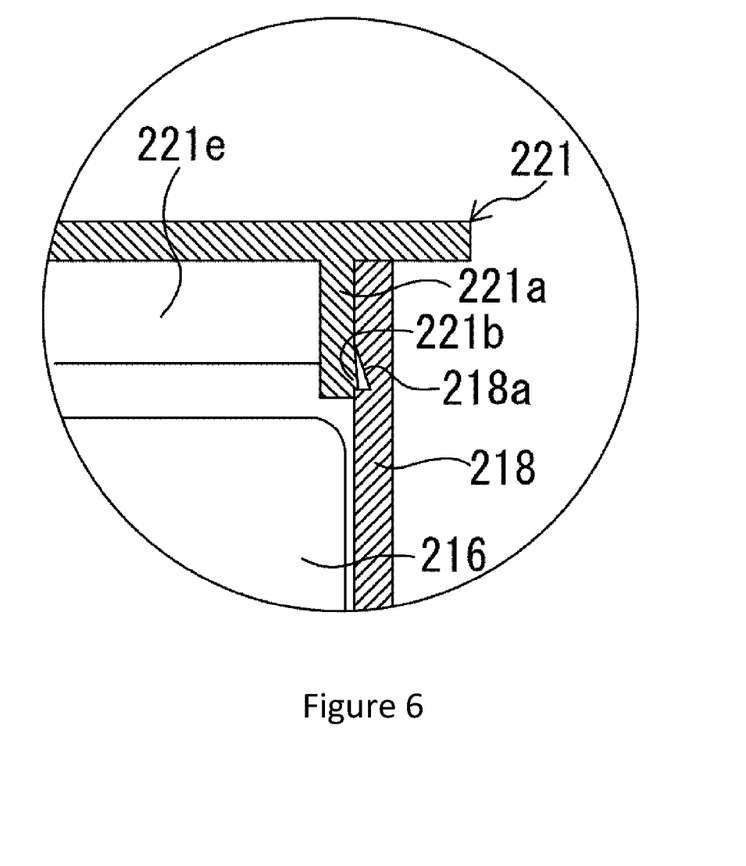
FIG. 6 is a partially enlarged view illustrating another modification of the safety apparatus in FIG. 1.

Instead of the engagement mechanism according to the embodiment, a snap-fit locking mechanism may be used. Specifically, any locking mechanism may be used in which (a) as illustrated in FIG. 6, a recess 218a provided on an inner wall of an opening end of a container 218 and a protrusion 221b provided on an outer wall of a projection 221a protruding from a lid 221 inside the container 118 are locked with each other, (b) a protrusion provided on the inner wall of the opening end of the container and a recess provided on the outer wall of the projection protruding from the lid inside the container are locked with each other (not shown), and (c) a protrusion provided on an inner wall of a projection (which is the same as the projection in the embodiment except that the second through hole 21c is not provided) of the lid larger than a diameter of the container and a recess provided on an outer wall of the opening end of the container are locked with each other, or (d) a recess provided on the inner wall of the projection (which the same as the projection in the embodiment except that the second through hole 21c is not provided) of the lid larger than the diameter of the container and a protrusion provided on the outer wall of the opening end of the container are locked with each other (not shown). Note that the protrusion here may be a continuous annular protrusion or may be an independent rod-shaped protrusion. The recess here is an annular groove in a case where the recess is an annular protrusion, and may be an annular groove or an independent recess in a case where the protrusion is an independent rod-shaped protrusion.

In each embodiment, the gas generator is adopted as the power source, but the configuration is not limited as long as the sliding member can apply a driving force for propelling the inside of the cylinder to the sliding member. For example, an elastic body such as a spring may be adopted.

In the embodiment, the container 18 has a cylindrical shape. However, the present invention is not limited to this, and the container 18 may have another shape such as a quadrangular cylinder.

The piston member 10 in the embodiment may be configured as a telescopic structure.

In each embodiment, when a parachute or a paraglider is adopted as the ejected object, the parachute or the paraglider may be packed. The packing is configured to be broken or peeled off during operation.

In each embodiment, the parachute or paraglider have been described as the ejected object, but the present invention is not limited thereto. An ejected object including a lift generation member may be ejected as the ejected object. Examples of the lift generation member include a parafoil, a Rogallo parachute, a single surface parachute, an airplane wing, a propeller, and a balloon. When the lift generation member has a control line, the safety apparatus desirably includes a steering mechanism capable of changing an inclination angle of the ejected lift generation member using the control line. This steering mechanism includes a plurality of reels for winding up a plurality of control lines coupled to the lift generation member and includes a motor serving as power of the reels, for example. By winding up or pulling out the control lines by driving the motor, it is possible to appropriately pull the lift generation member or loosen a tension.

The cylinder, the power source, and the container are preferably coupled or fixed to the airframe by a rubber band, a belt, a string, or other means (mechanical joint, bolt, fastener, or adhesive) in the embodiment.

Figure 7:
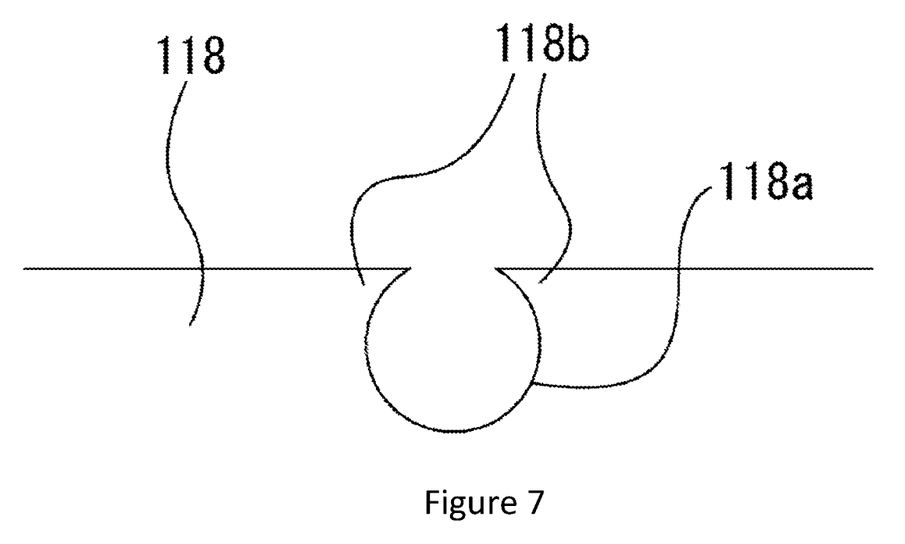
FIG. 7 is a partially enlarged view illustrating still another modification of the safety apparatus in FIG. 1.

As illustrated in FIG. 7(a), a cylindrical protrusion 321f communicating with a first through hole 318a outside a projection 321a of a lid 321 and including a peripheral wall surrounding an outer periphery of a head 322a on an inner side may be formed. This configuration can prevent a pin member 322 from being pulled out and the lid 321 from being opened by inserting a nail puller, a flathead screwdriver, or the like.

In a state illustrated in FIG. 7(a), an inner wall (peripheral wall) of the cylindrical protrusion 321f can be brought into contact with the head 322a by pressurizing the cylindrical protrusion 321f from outside to inside, and caulked and fixed. Accordingly, it is possible to prevent the head 322a from coming off and scattering to the outside during operation.

In the state illustrated in FIG. 7(a), resin functioning as an adhesive may be filled between the head 322a and the inner wall (peripheral wall) of the cylindrical protrusion 321f and solidified to fix the head 322a and the cylindrical protrusion 321f. Accordingly, it is possible to prevent the head 322a from coming off and scattering to the outside during operation.

The head 322a and the cylindrical protrusion 321f that have been caulked and fixed may be further bonded and fixed with resin. Accordingly, it is possible to further prevent the head 322a from coming off and scattering to the outside during operation.

As illustrated in FIG. 7(b), a recess 421f communicating with a first through hole 418a outside a projection 421a of a lid 421 may be formed. This configuration can prevent a pin member 422 from being pulled out and the lid 421 from being opened by inserting a nail puller, a flathead screwdriver, or the like.

In the state illustrated in FIG. 7(b), resin functioning as an adhesive may be filled between the head 422a and an inner wall (peripheral wall) of the recess 421f and solidified to fix the head 422a and the recess 421f Accordingly, it is possible to prevent the head 422a from coming off and scattering to the outside during operation.

REFERENCE SIGNS LIST 10 piston member
11 body
12, 22b, 322b, 422b rod
13 bore
14 cylinder
15 push-up member
16 ejected object
17 gas generator
18, 118, 218 container
18a, 118a, 318a, 418a first through hole
18b, 118b, 318b, 418b breakable portion
19 bottomed cylindrical portion
20 support
21, 221, 321, 421 lid
21a, 221a, 321a, 421a projection
21b, 321b, 421b receiving member
21c, 21d, 321c, 321d, 421c, 421d second through hole
21e, 321e, 421e reinforcing member
22, 322, 422 pin member
22a, 322a, 422a head
23 stopper
24, 25, 26 vent hole
30 aerial vehicle
31 airframe
33 leg
40 coupling member
100 safety apparatus
218a recess
221b protrusion
321f cylindrical protrusion
421f recess

The invention claimed is:
1. A safety apparatus comprising:
a container having a bottomed cylindrical shape and including an opening end at one end;
a lid including, at an edge, a projection in contact with a side wall of the container, and configured to close the opening end before operation and open the opening end of the container after operation;
an ejector that is installed inside the container and ejects an ejected object accommodated in the container; and an engagement mechanism that performs engagement between a side wall of the opening end and the projection by inserting a pin member into a first through hole penetrating toward a center of the container in the side wall of the opening end and a second through hole penetrating toward a center of the lid in the projection;

wherein the ejector includes a push-up member that pushes up the lid during operation, in the engagement mechanism, when the lid is pushed up by the push-up member during operation, at least the first through hole or the second through hole is broken by the pin member, or the pin member is broken by the first through hole or the second through hole, and the engagement is released, and in the locking mechanism, when the lid is pushed up by the push-up member during operation, the locking is released.

2. The safety apparatus according to claim 1, wherein a part of the first through hole or a part of the second through hole is provided with a notch.

3. The safety apparatus according to claim 1, wherein the projection is provided outside the opening end, and the lid includes a receiving member at a position facing the projection and sandwiching the opening end, the receiving member receiving a first end of the pin member.

4. The safety apparatus according to claim 1, wherein the pin member is provided with, at a second end, a head having a diameter larger than a diameter of the first through hole, and the projection has, on an outer side, a peripheral wall that surrounds an outer periphery of the head and has an inner side communicating with the first through hole.

5. The safety apparatus according to claim 4, wherein the projection has, on the outer side, a cylindrical protrusion having the peripheral wall, and the head is caulked and fixed to the cylindrical protrusion.

6. The safety apparatus according to claim 4 wherein the head is fixed to the peripheral wall with a resin.

7. The safety apparatus according to claim 1 wherein in the locking mechanism, a protrusion provided on the projection and a recess provided on the side wall of the opening end are locked with each other, or a recess provided on the projection and a protrusion provided on the side wall of the opening end are locked with each other.

8. The safety apparatus according to claim 1, wherein the lid has a top surface having an inner side or an outer side provided with a reinforcing member that reinforces the lid.

9. An aerial vehicle comprising the safety apparatus according to claim 1, wherein the ejected object is a parachute or a paraglider.

10. The safety apparatus according to claim 1, wherein the pin member is provided with a locking portion that prevents the pin member from coming off after the pin member is inserted into the first through hole and the second through hole ensuring thereby engagement between the sidewall and the projection.

* * * * *